United States Patent
Gray et al.

[15] 3,663,155

[45] May 16, 1972

[54] STAINING PLASTIC SURFACES

[72] Inventors: Don N. Gray, Okemos; Bruce M. Mueller, Ottawa Lake, both of Mich.

[73] Assignee: Owens-Illinois, Inc.

[22] Filed: Sept. 30, 1968

[21] Appl. No.: 763,937

[52] U.S. Cl. ...................................8/4, 117/38, 260/37
[51] Int. Cl. .................................................D06p 5/04
[58] Field of Search ...............8/4, 62, 94; 117/138.8 E, 38

[56] References Cited

UNITED STATES PATENTS

| | | | |
|---|---|---|---|
| 3,502,495 | 3/1970 | Akamatsu | 117/38 |
| 2,274,751 | 3/1942 | Sowter et al. | 8/94 X |
| 2,524,811 | 10/1950 | Koberlein | 8/4 |
| 2,828,180 | 3/1958 | Sertorio | 8/62 |
| 3,009,760 | 11/1961 | Lenz | 8/4 |
| 3,034,847 | 5/1962 | Chapman | 8/4 |
| 3,290,166 | 12/1966 | Sharp et al. | 117/138.8 E |
| 3,467,481 | 9/1969 | Gold | 8/4 |
| 3,477,799 | 11/1969 | Garnett | 8/4 |

OTHER PUBLICATIONS

Exparte Schoeneberg et al., decision of the Board of Appeals, U.S. Pat. No. 3,190,718, paper No. 27, 4 pages.

Exparte Schoonover et al., decision of the Board of Appeals, U.S. Pat. No. 2,743,991, paper No. 23, 6 pages.

*Primary Examiner*—George F. Lesmes
*Assistant Examiner*—T. J. Herbert, Jr.
*Attorney*—Donald K. Wedding and E. J. Holler

[57] ABSTRACT

Plastic articles are provided with sub-surface markings which are scuff-proof and resistant to acid, alkali and solvent attack; a staining composition which includes a dye and a sublimable or pyrolyzable carrier is applied to the article and the article is heated whereby the dye penetrates and diffuses into the article and the carrier is volatilized.

9 Claims, No Drawings

STAINING PLASTIC SURFACES

THE INVENTION

This invention relates to the permanent marking, printing or decorating of polymeric surfaces. More particularly, it relates to the formation of sub-surface markings on polymeric substrates, including articles such as beakers and container items, which are scuff-proof and highly resistant to chemical attack, e.g. by caustic, hydrochloric acid and sulfuric acid.

Untreated polyolefins, and other polymers produced from monomers having monoethylenically unsaturated bonding, will not permit conventional ink coatings to adhere thereto. Standard type inks, e.g. gravure, silk screen, flexographic and dry offset inks, when applied to these type surfaces and dried or cured in accordance with the normal schedule for any particular ink or coating, are easily removed therefrom by a slight scraping action. Another drawback of these compositions, which is especially acute in the marking of plastic laboratory ware such as, for example, beakers, flasks and pipets, is that they are subject to attack by solutions of acid, alkali or solvents.

In recent years much has been done in this field to develop techniques for improving the adherence of inks, markings and coatings to polymeric materials. These efforts have been primarily restricted to various surface treatment procedures such as applying an oxidizing solution of sodium dichromate and sulfuric acid to the polymer surface or flame treating the surface prior to ink application. While somewhat successful, these techniques still result in markings or prints which can be chemically removed or physically removed by scraping because the final marking is typically raised, or projects upwardly of the polymer surface, thereby making it highly susceptible to abrasion and/or chemical attack. Additionally, these treatments tend to change the properties of the polymeric materials and make them more reactive with alkalies and acids. Those skilled in the art readily appreciate that the necessity of a pretreatmemt substantially increases the cost of manufacturing marked polymeric materials.

Still more recently, techniques have been developed for penetrating the polymeric surface during marking. U. S. Pat. Nos. 3,057,098 and 3,290,166 respectively, disclose these techniques. In the former patent the polymeric surface is penetrated by a puncturing or scoring step, the marking composition then being applied to the resulting recesses. It will be appreciated, especially in the case where arcuate surfaces are involved, that this approach is impractical in the manufacture of container items because of the precision and care which is required to guard against forming a puncture which is coextensive with the wall thickness of the container. The latter patent relates to colored low molecular weight polyolefin marking compositions. Here the composition is applied to the substrate and, after a heating step, the composition per se partially penetrates the substrate surface. This technique results in a marking which can be scraped off with a knife blade.

This invention distinguishes over the prior art in that it is directed to a plastic surface marking which is disposed entirely beneath the surface and which cannot be removed by abrasion or scraping without destroying the surface to which it is appendant. Moreover, because of the sub-surface nature of the marking, it is highly resistant to attack by caustic, sulfuric acid, hydrochloric acid and other solvents. The durable and resistant sub-surface mark, print, or decoration which is provided by this invention is obtainable without the use of any pretreatment steps and the resulting surface will be uniform, showing no signs of the surface having been punctured or scored.

In order to obtain the improved marked plastic surfaces as contemplated herein, a staining or marking composition comprising a surface penetrating dye and a sublimable carrier for the dye is applied in a selected pattern onto a decorable plastic substrate. The substrate is then heated for a sufficient time to allow the dye, or at least a portion of the dye, to penetrate and diffuse into the structure of the plastic substrate, thus producing the sub-surface marking. Typically, the sublimable carrier is one which sublimes during the dye-diffusion step such that upon completion of the substrate heating there will remain no substantial amount of the carrier. The carrier need not, however, be of the type which penetrates the substrate. As used herein, sublimable carrier is also intended to include those materials which pyrolyze to gaseous products. While the amount of dye which is incorporated in the staining or marking composition may be adjusted such that it will diffuse in toto into the substrate, the composition may include an excess of dye. As already mentioned, the carrier will be dissipated, via sublimation or pyrolysis, during the heating and diffusing step. Consequently, if an excessive amount of dye is employed such excess portion will remain as a residue on the surface of the substrate, the carrier having been volatilized. Such excess residue may be conveniently removed by any convenient means including wiping or like means. In a preferred embodiment hereof such residue is removed by pneumatic means. That is, the residual dye is preferably removed by contacting the substrate with a source of vacuum or by impinging a stream of pressurized air onto the substrate. If desired, however, the residue may be removed by washing or wiping in a suitable solvent such as an alcohol or benzene.

In the practice of this invention, the marking composition, in addition to the organic colorant and carrier, may also include suitable adjuvants. The adjuvants employed, such as anti-foaming agents and thickening agents, will be readily selected by those skilled in the art. They are used to adjust the consistency and viscosity of the marking composition to that required for the specific printing or marking technique being employed. As in the case with the removal of an exdess amount of dye, the residual adjuvants may likewise be removed by a suitable solvent or dispersant or, preferably, by pneumatic means.

Plastic materials which may be decorated and marked in accordance with the teachings of this invention include the polycarbonates, polyolefins, and those plastics manufactured from monoethylenically unsaturated monomers such as, for example, vinyl polymers and polystyrene. Thus, suitable compositions in general include polymers and copolymers of the following monomers: ethylene, propylene, butene-1. pentene-1. hexene-1, 3 methyl butene-1, 4 methyl pentene-1, 5 methyl hexene-1, styrene, vinyl chloride and vinyl acetate.

The organic colorants suitable for the practice of this invention are those compounds known in the printing and decorating arts as dyes. It will, of course, be readily apparent that the specific dye employed will depend upon the requirements of the article manufactured. For a comprehensive list of available dyes, reference may be made to The Chemistry of Synthetic Dyes and Pigments, by H. A. Lubs, Reinhold Publishing Corporation, 1955. Representative classes of dyes include acid, basic, spirit oil, vat and disperse dyes. Table I represents a partial summary of commercially available diffusable dyes suitable for the practice of this invention.

This invention is advantageously practiced by applying the dye as a solution or dispersion in suitable carrier medium. The carrier medium per se may comprise a pyrolyzable or sublimable carrier of the type discussed hereinbefore, alone or in combination with a suitable vaporizable vehicle or solvent. When the latter type carrier medium is employed, the vehicle will be selected such that it will either be vaporized prior to the step of diffusing the dye into the plastic article and subliming the carrier or will occur simultaneously therewith. The staining composition may be applied to the surface of a plastic substrate by means of any conventional decorating technique such as, for example, silk-screen gravure, letterpress, or offset printing. Moreover, if desired, a decalcomaniatype decorating technique may also be advantageously employed; in this type of staining the volatilizable carrier will be a film former. That is, the carrier will first be formed into a solid film and the dye will be carried in a selected pattern by this film. The dye-bearing film will then be applied to the plastic substrate with the dye in contact with the plastic surface. Upon heating, the film

TABLE I

| Company | Product | Description | C.I. |
|---|---|---|---|
| Interchemical Corporation, Color and Chemical Div | Yellow G. Base | Disperse Yellow 3 | C.I. 1803. |
| | Blue N.S.P. Base | Disperse Blue 1 | C.I. 1709. |
| | Red R.N. Base | Disperse Red 17 | C.I. 1305. |
| General Aniline & Film Corporation | Sudan Red MR | | |
| | Celliton Fast Blue AF | | C.I. 61115 |
| | Resoform Red BN | | C.I. 60710 |
| | Sudan Green 4B | | C.I. 60710 |
| | Azosol Brilliant Yellow 8 GF | Solvent Yellow 43 | |
| E. I. Du Pont de Nemours & Co., Inc | Rhodamine B Base | | |
| Patent Chemicals Co | Fluid Blue 8 | | |
| | Fluid Green 1 | | |
| | Fluid Black 1 | | |
| | Fluid Red G | | |
| | Fluid Red 29 | | |
| | Fluid Bronze 1 | | |
| | Fluid Yellow 8 | | |
| National Aniline, Div. of Allied Chemical Co | Plasto Blue RDA | | | will turn into gaseous products and the dye will diffuse into the plastic surface, hence producing the sub-surface decoration.

Adjuvants which are advantageously incorporated into the staining composition may include thickening agents, and antifoaming agents, all of which are well known in the art. Suitable antifoams include the silicones manufactured and supplied by the General Electric Company such as, for example, AF-3, AF-5, AF-7, which are dimethylpolysiloxanes. Agents which may be employed to thicken and adjust the consistency of the dye-bearing composition include small particulate silica and/or bentonite compositions. Suitable extremely fine particle size silica is commercially supplied by the Cabot Corporation under the name Cab-O-Sil. Bentonite compounds are well known products and are freely disclosed in U. S. Pat. No. 2,531,427, in Chemical Engineering, Mar. 1952, Pg. 226 to 230, in the Journal of Physical and Colloid Chemistry, Vol. 53, Feb. 1949, and Vol. 54, Nov. 1950. These materials are commercially known under the trademark "Bentone," owned by the National Lead Company, with specific products being designated as Bentone 18, Bentone 27, Bentone 34 and Bentone 38.

The sublimable carriers which may be advantageously employed in the practice of this invention will generally include those materials which sublime at about the temperature range required for diffusing the dye into the plastic or which pyrolyze at such temperatures to produce gaseous products. It will, of course, be apparent that suitable decomposition catalysts may be used to facilitate the pyrolysis of the carrier. Suitable sublimable carriers include para-dichlorobenzene, biphenyl, and naphthalene, while suitable pyrolyzable carriers include poly (alpha-alkyl styrene), wherein the alkyl is lower alkyl having from one to nine carbon atoms, polymers of the family of olefin sulfones and preferably alpha olefin sulfones, wherein the olefin has up to 30 carbon atoms, and atactic or isotactic poly (alkylene oxide) wherein the alkylene group has from two to 30 carbon atoms. When the latter type carrier is employed, suitable decomposition catalysts, for example Lewis Acids, will advantageously be incorporated in the staining composition. Specific pyrolyzable carriers of the type noted above which will be successfully employed in the practice of this invention include polypropylene oxide, poly-alpha methylstyrene and the polymer of octadecene sulfone.

Preferably, when applying the staining compositions by silk-screen, offset or like decorating technique, the alpha alkyl styrene polymer will have a molecular weight of less than 1,000. An acceptable alpha alkyl styrene polymer is alpha methyl styrene which is produced and obtainable from Dow Chemical Company as their product 276-V2 and 276-V9, having molecular weights of 325 and 355 respectively. Both of these are liquid resins and may be employed as the carrier medium for the dye without any additional vehicles or solvents. Higher molecular weight polymers may be employed and, in fact, are preferable when the decorating or marking is to be done by decalcomania-type decorating.

The methods for preparing suitable polyalkylene oxide polymers are disclosed in U. S. Pat. Nos. 2,706,181, 2,706,189, 2,811,491 and 2,706,182. Likewise, the preparation of polypropylene oxide, which is advantageously employed in the practice of this invention, is freely disclosed by W. R. Sorenson and T. W. Campbell, "Preparative Methods of Polymer Chemistry," Interscience Publishers Inc. (1961) at page 250, all of which are hereby incorporated by reference. The molecular weights of these polymers may vary over a considerable range and will be readily selected by those skilled in the art, depending upon the mode by which the staining composition is applied. For example, if the dye is applied by a decalcomania technique, the polyalkylene oxide will be a film former and will typically have a molecular weight in excess of 50,000 and, preferably, in excess of 100,000. On the other hand, if the dye is carried by a staining composition which is to be applied by silk-screen, letterpress, gravure, offset or other like decorating method, the polyalkylene oxide may have a molecular weight of the same magnitude, a lower magnitude such as, for example, 400–10,000, or the molecular weight may encompass the entire range. Unlike the use of alpha-alkyl styrene polymers which are liquids and, consequently, may exclusively be employed as the carrier medium for a dye when using the latter type decorating techniques, the carrier medium for the dye in this case will also include a suitable vehicle or solvent for the alkylene oxide polymer. The vehicle may be selected from a wide range of materials including benzene, toluene, dioxane, Cellosolves and Carbitols. Additionally, the carrier medium will also include a suitable decomposition catalyst such as a Lewis Acid, and preferably, boron trifluoride, which will facilitate the pyrolysis and vaporization of the polymeric carrier.

As previously noted, polymers of the family of olefin sulfones and preferably alpha olefin sulfones, wherein the olefin has up to 30 carbon atoms, may also be employed in the practice of this invention. The methods of preparing these polymers are well known and freely described in the literature. U. S. Pat. Nos. 2,602,787, 2,593,414 and 2,645,631, all of which are assigned to Philips Petroleum Co., disclose the polymerization of sulfur dioxide with olefin monomers. These polymers, as is the case with polyalkylene oxide copolymers, will generally be carried by a suitable vehicle or solvent when applied with a dye by letterpress, silk-screen, gravure or offset printing techniques. Typical solvents which may be employed include alcohols, Carbitols and aromatics such as benzene and toluene.

In accordance with the specific practice of this invention, the staining composition is prepared by appropriately mixing or otherwise physically combining the dye and carrier and is then applied to the surface of the plastic substrate. Additionally, especially when a solid sublimable carrier is employed and the staining composition applied by letterpress, silk-screen or other like decorating technique, the staining composition will advantageously include a volatile vehicle or solvent for the carrier. Once the prepared staining composition is applied to the substrate, it is heated for a period of time sufficient to obtain the desired depth of dye diffusion and to allow the carrier medium to sublime. The intensity and duration of the heating will generally be dependent upon the article involved; however, it is typically sufficient to heat the decorated article to a temperature range of 150°–310° F. for a period of about 2-35 minutes. When no adjuvants are added to the staining composition and no excess dye is employed, there will then result a plastic article in which the marking is entirely disposed beneath the surface. Should an excess of dye, or adjuvants, be employed, the same sub-surface marking will result; however, it will generally be necessary to first remove the residual dye or adjuvants remaining on the surface. Since the carrier will have been sublimed, there will be no form of binder for the residuals and they may be conveniently removed by use of a pressurized air stream or by vacuuming the substrate surface. Washing of the surface will of course be equally satisfactory.

Because of the sub-surface marking which is produced, this invention is especially useful in permanently marking plastic scientific ware such as graduated cylinders, beakers, pipettes, centrifuge tubes and the like. In addition to these articles, it will be apparent that this invention may also be employed in decorating a wide variety of other plastic substrates.

In general, as noted hereinbefore, a broad class of dyes may be employed in the practice of this invention. Representative classes include monoazo, diazo, azoic, acridine, azine, ketone imine, methene, nitro, nitroso, oxazine, quinoline, xanthene and anthroquinone. Because of the numerous dyes which are available, it would be highly impractical to set forth a comprehensive list. Furthermore, since the practice of this invention has wide utility, the desired decoration may have different requirements; that is, in one case only a faint or soft sub-surface marking may be desired whereas in a different application a highly intense decoration may be required. Since the mechanism of dye diffusion into the polymer is not fully understood, some experimentation will be required in order to determine the optimum method conditions for a specific application. This can be done by simply placing the dye on the plastic to be decorated, heating the plastic and dye and then removing any residual dye from the surface. Those skilled in the art will readily adjust the method to their specific requirements by visually observing the intensity of the resultant, sub-surface marking. However, in order to aid those skilled in the art to duplicate this invention, a list of acceptable diffusable dyes is set forth in Table I; it will, of course, be apparent that these dyes are merely exemplary and are not to be taken as limiting the scope of this invention.

In Table I Rhodamine B Base has the following structural formula:

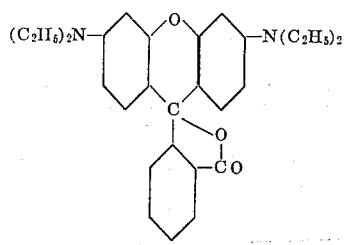

Plasto Blue RDA has the chemical index name Solvent Blue 16. As examples of other similarly acceptable diffusable dyes may be cited Pyronine G (C. I. 739), Saccharein (C. I. 744), Rhodamine S (C. I. 743), Rhodamine 5G (C. I. 746), 1,4-dialkylamine-2, 3-dichloranthraquinone, 3-amino-1,3-dibromoanthraquinone, 1-bromo-4-hydroxyanthraquinone and other substituted anthraquinone dyes.

The hereinafter examples represent some of the best modes contemplated by the inventor in the practice of this invention. The specific dye employed was a 1, 4 dialkylamine anthraquinone such as that manufactured and supplied by the National Aniline Division of Allied Chemical Company under the name Plasto Blue RDA.

EXAMPLE 1

A staining composition having a polypropylene oxide carrier is prepared and used according to the following procedure. The polypropylene oxide is prepared by polymerizing propylene oxide in the presence of a ferric chloride complex catalyst. The complex ferric chloride catalyst is prepared in a polymer tube by dissolving 1.0 grams of anhydrous ferric chloride in 5 ml. of diethyl ether and gradually adding 1.0 grams of liquid propylene oxide with agitation and cooling at temperatures below 60° C. When condensation of the ferric chloride and propylene oxide is completed, the product is warmed in a vacuum to remove volatiles leaving a semi-solid brown residue. Propylene oxide (100 grams) is then added to this residue. The tube is cooled under nitrogen and sealed. This mixture is heated at 80° C with agitation for 88 hours, at which time the polymerization is complete and there is obtained about 90-95 grams of a brown solid polymer. This polymer is dissolved in hot acetone and concentrated hydrochloric acid is added to convert the iron complex into soluble ferric chloride. The solution is then chilled to −20° C whereby the solid polymer crystallizes from solution and is separated by filtration. The polymer is then twice reprecipitated in the same manner to obtain a pure white polypropylene oxide having a melting point of about 70° C.

About 15 grams of the above polypropylene oxide is then dissolved in about 60 grams of tetrahydrofuran with agitation and about 5 grams of boron trifluoride and 10 grams of the Plasto Blue RDA added thereto. Agitation is then continued for several minutes. Cab-O-Sil, a finely-divided particulate silica material supplied by the Cabot Corporation, may then be added in any desired proportion to adjust the viscosity of the staining composition. For purposes of silk-screen application, several grams, for example 5-10 grams, will be generally sufficient. After the viscosity of the staining composition is adjusted, the resulting mixture is applied in a selected pattern through a silk-screen onto a polycarbonate substrate. The substrate is then heated for about 30 minutes at a temperature of about 150° C whereby the tetrahydrofuran evaporates and the polypropylene oxide pyrolyzes and a portion of the dye penetrates and diffuses into the polycarbonate substrate. The slight residue which remains is removable by wiping or washing with water. There then remains a marking in the polycarbonate substrate which is diffused therein. This marking cannot be removed by vigorous scraping with a knife blade and is highly resistant to concentrated hydrochloric acid (specific gravity 1.18), concentrated sulfuric acid (specific gravity 1.84) and 1N sodium hydroxide.

EXAMPLE 2 about 15 grams of para-dichlorobenzene is dissolved in approximately 15 grams of benzene and to this solution is added about 0.1 gram of Plasto Blue RDA dye with agitation for several minutes. The resulting composition is then applied, for example, by use of a stamping operation, to the surface of a polypropylene substrate. The dye is then diffused into the substrate and the benzene and para-dichlorobenzene vaporized by heating the substrate to about 105° C for about 15 minutes, after which time there remains in the substrate a sub-surface marking which cannot be removed by vigorous scraping and which is highly resistant to 1N sodium hydroxide, concentrated hydrochloric acid and concentrated sulfuric acid.

EXAMPLE 3

A staining composition having a polypropylene oxide carrier is used to decorate a plastic substrate by decalcomania type decorating according to the following procedure. The polypropylene oxide prepared as described in Example 1 is dissolved in tetrahydrofuran and to this solution is added boron trifluoride in the ratio of about 5 parts polypropylene oxide to 1 part boron trifluoride. Generally, a ratio of polypropylene oxide to boron trifluoride in the range of 3:1 to 10:1 will be acceptable. A film cast of this mixture is then prepared by conventional film casting techniques using a smooth stainless steel base, the tetrahydrofuran being vaporized by employing a circulating air oven. There will thus be produced a solid polymeric film having a thickness of about 0.5–1 mil. One surface of the resulting film is then decorated with the staining composition disclosed in Example 1 using a standard silk-screen technique and the tetrahydrofuran is again allowed to evaporate. The dye-carrying film is then applied to a polycarbonate substrate with the decorated surface of the film in contact with the substrate. The substrate is then heated to a temperature of about 150° C for about 30 minutes whereby the film pyrolyzes leaving a slight residue which is readily removable by washing with water. There then remains in the polycarbonate substrate a sub-surface marking corresponding to the pattern applied to the film by the silk-screen application.

Thus, in accordance with this invention, there is provided an improvement in decorating or marking plastic substrates wherein the substrate is provided with a sub-surface marking, the removal of any excess marking composition being greatly facilitated by the volatilization of the carrier medium.

Those skilled in the art will readily modify the teachings of this invention by employing other suitable pyrolyzing or subliming carriers alone or in combination with other suitable vehicles, e.g., which act as solvents. Examples of other suitable vehicles include xylynols, toluene, Cellosolve and Carbitol which may be substituted for benzene when using para-dichlorobenzene or other sublimable materials. Additionally, other beneficial adjuvants may also be incorporated in the staining composition. Consequently, the true scope of this invention is not intended to be limited except as described in the following claims.

We claim:

1. A process for providing a permanent sub-surface marking on a decorable plastic article wherein said plastic is selected from polycarbonates, and polymers and copolymers of monoethylenically unsaturated monomers, said method comprising
   a. applying a decorative composition to the surface of said article, said decorative composition consisting essentially of polypropylene oxide, tetrahydrofuran, boron trifluoride, a plastic-surface penetrating dye, and solid particulate silica in the proportions of about 15 grams of said polypropylene oxide, about 60 grams of said tetrahydrofuran, about 10 grams of said dye, about 5–10 grams of said particulate silica, and the amount of boron trifluoride providing a ratio of polypropylene oxide to said boron trifluoride of about 3:1 to about 10:1,
   b. heating said surface for a time and at a temperature sufficient to evaporate said tetrahydrofuran and to pyrolyze and vaporize said polypropylene oxide and to diffuse at least a portion of said dye into said surface of sad article, and
   c. removing residual material from said surface of said article.

2. The process of claim 1 wherein said dye has the formula:

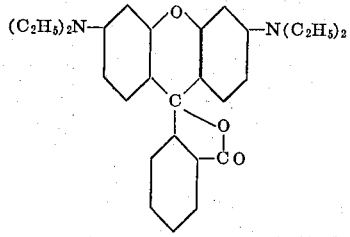

3. The process of claim 1 wherein said dye is an anthraquin- one dye.

4. A process for providing a decorable plastic article with a permanent sub-surface marking wherein said plastic is selected from polycarbonates, and polymers and copolymers of monoethylenically unsaturated monomers, said method comprising:
   I. applying a decorative composition onto the surface of said article, said composition consisting essentially of
      A. a plastic-surface penetrating dye,
      B. a carrier for said dye selected from the group consisting of:
         1. a liquid, pyrolyzable alpha-alkyl styrene polymer having a molecular weight of less than 1,000, wherein the alkyl has from one to nine carbon atoms,
         2. a pyrolyzable polymer of an alpha-olefin sulfone in a volatile vehicle wherein the olefin has up to 30 carbon atoms,
         3. an atactic or isotactic, pyrolyzable poly (alkylene oxide) and a Lewis Acid decomposition catalyst in a volatile vehicle, wherein the alkylene group has from two to 30 carbon atoms,
      said volatile vehicle being so selected that it will evaporate when heated to a temperature range of 150°–310° F. for about 2–35 minutes,
   II. heating said surface having said decorative composition to a temperature of about 150°–310° F. for about 2–35 minutes to vaporize the pyrolyzable materials in said decorative composition and to cause said dye to penetrate said surface.

5. The method of claim 4 wherein said decorative composition further includes a consistency adjusting amount of a particulate silica or bentonite clay and wherein said method further includes the step of (III) removing residual material from the surface of said article.

6. The method of claim 5 wherein step III is effected by the use of an air stream.

7. The method of claim 6 wherein said carrier is a liquid, pyrolyzable poly-alpha-methylstyrene.

8. The method of claim 6 wherein said carrier is a polymer of octadecene sulfone in a volatile article.

9. A process for providing a permanent sub-surface marking on a decorable plastic article selected from the group consisting of polycarbonate, polyethylene, polypropylene, polystyrene and polymers and copolymers of monomers selected from the group consisting of butene-1, pentene-1, hexene-1, 3-methylbutene-1, 4-methylpentene-1, 5-methylhexene-1, vinyl chloride and vinyl acetate, said method comprising
   a. applying a decorative composition to the surface of said article, said decorative composition consisting essentially of a dye capable of penetrating the surface of said article and a pyrolyzable carrier for said dye selected from the group consisting of poly(alpha-alkylstyrene) wherein the alkyl group has from one to nine carbon atoms, polyolefin sulfones containing up to 30 carbon atoms in a solvent for said sulfones, atactic and isotactic poly(alkylene oxide) wherein the alkylene radical has from two to 30 carbon atoms in a solvent for said oxide, and
   b. heating said surface of said plastic article for a time and at a temperature sufficient to pyrolyze said carrier and to diffuse at least a portion of said dye into said surface of said article, and
   c. removing residual decorative composition from said surface of said article.

* * * * *